(12) United States Patent
Noguchi et al.

(10) Patent No.: US 7,408,685 B2
(45) Date of Patent: Aug. 5, 2008

(54) IMAGE READING APPARATUS AND METHOD OF CONTROLLING SAME

(75) Inventors: Hiroyuki Noguchi, Kawasaki (JP);
Yasushi Ishida, Meguro-ku (JP);
Shigeyuki Sugiyama, Hiratsuka (JP);
Katsumi Obana, Funabashi (JP);
Takayuki Nishinohara, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 11/062,844

(22) Filed: Feb. 23, 2005

(65) Prior Publication Data

US 2005/0190412 A1     Sep. 1, 2005

(30) Foreign Application Priority Data

Feb. 27, 2004   (JP) .............................. 2004-054639

(51) Int. Cl.
*H04N 1/04* (2006.01)
(52) U.S. Cl. ................... 358/487; 358/474; 358/494; 358/496
(58) Field of Classification Search ............. 358/487, 358/474, 494, 496, 497, 506
See application file for complete search history.

(56) References Cited

U.S. PATENT DOCUMENTS

| | | | | |
|---|---|---|---|---|
| 4,989,099 | A | * 1/1991 | Koshiyouji et al. | 358/474 |
| 5,457,547 | A | * 10/1995 | Yamada | 358/487 |
| 5,745,248 | A | 4/1998 | Nickerson | 358/296 |
| 5,767,945 | A | 6/1998 | Fields et al. | 355/39 |
| 5,780,829 | A | 7/1998 | Tsai et al. | 235/454 |
| 6,239,817 | B1 | 5/2001 | Meyer | 347/36 |
| 6,297,874 | B1 | 10/2001 | Ikeda et al. | 355/40 |
| 6,411,324 | B1 | 6/2002 | Christiansen et al. | 347/248 |
| 6,415,115 | B1 | 7/2002 | Moritani | 399/82 |
| 6,417,937 | B1 | 7/2002 | Batten et al. | 358/487 |
| 6,612,240 | B1 | 9/2003 | Silverbrook et al. | 101/424.1 |
| 6,982,809 | B2 | 1/2006 | Kagaya | 358/1.18 |

(Continued)

FOREIGN PATENT DOCUMENTS

CN        2278971 Y       4/1998

(Continued)

OTHER PUBLICATIONS

Chinese Office Action, dated Aug. 31, 2007, regarding Application No. 2005100087389.

(Continued)

*Primary Examiner*—Houshang Safaipour
(74) *Attorney, Agent, or Firm*—Fitzpatrick, Cella, Harper & Scinto (57) ABSTRACT

In an image reading apparatus that is capable of reading a transparent original and a reflective original, a navigation sheet (24) on which the content of transparent-original read processing has been entered and a film guide (25) holding a transparent original are placed on an original table (23), and the navigation sheet (24) is read first to recognize the content thereof. Next, a scanner carriage unit (22) is moved so that the transparent original being held by the film guide (25) is read in based upon the result of recognition of the navigation sheet (24). Since a method of reading the transparent original can be designated using the navigation sheet, it is easier to perform the reading of a transparent original using a stand-alone image reading apparatus.

4 Claims, 8 Drawing Sheets

U.S. PATENT DOCUMENTS

| | | |
|---|---|---|
| 7,002,712 B2 | 2/2006 | Baker et al. .................. 358/474 |
| 2002/0051242 A1 | 5/2002 | Han et al. .................... 358/474 |
| 2003/0202222 A1 | 10/2003 | Amimoto et al. ............ 358/474 |
| 2004/0061905 A1 | 4/2004 | Ohara ......................... 358/402 |
| 2004/0246543 A1 | 12/2004 | Kurokawa et al. ........... 358/509 |

FOREIGN PATENT DOCUMENTS

| | | |
|---|---|---|
| CN | 2299426 Y | 12/1998 |
| CN | 1453738 A | 11/2003 |
| JP | 64-47155 | 3/1989 |
| JP | 03-062668 | 3/1991 |
| JP | 05-336306 * | 12/1993 |
| JP | 6-5251 | 1/1994 |
| JP | 06-046219 | 2/1994 |
| JP | 8-331494 | 12/1996 |
| JP | 10-126578 | 5/1998 |
| JP | 10-224528 | 8/1998 |
| JP | 10-233920 | 9/1998 |
| JP | 2000-358132 | 12/2000 |
| JP | 2001-265547 | 9/2001 |
| JP | 2001-313784 | 11/2001 |
| JP | 2002-077539 | 3/2002 |
| JP | 2003-5304 | 1/2003 |
| JP | 2003-75944 | 3/2003 |
| JP | 2003-110844 | 4/2003 |
| JP | 2003202633 A | 7/2003 |
| JP | 2003-305925 | 10/2003 |
| JP | 2003303065 A | 10/2003 |
| JP | 2004-5559 | 1/2004 |
| JP | 2004-007547 | 1/2004 |

OTHER PUBLICATIONS

Chinese Office Action dated Dec. 21, 2007, regarding Application No. 2005100087398.

* cited by examiner

ENTIRE IMAGE

FIG. 5B

NAVIGATION SHEET

TRIMMING DESIGNATION ZONE

ENTIRE IMAGE

IMAGE READING APPARATUS AND METHOD OF CONTROLLING SAME

FIELD OF THE INVENTION

This invention relates to an image reading apparatus and method of controlling the same. More particularly, the invention relates to an image reading apparatus capable of reading both a reflective original such as ordinary printed matter and a transparent original such as photographic film, and to a method of controlling this apparatus.

BACKGROUND OF THE INVENTION

Many recent image readers, especially flatbed-type image readers (referred to as "flatbed scanners" below), that are available on the market have a function for reading not only ordinary reflective originals but also transparent originals such as photographic film. In general, an image reading apparatus of this kind has a light source that is built in a document cover for pressing the original against the original table, and is so adapted that when a transparent original is read, the light source is lit to illuminate the transparent original and the transmitted light that has passed through the original is read.

In addition to flatbed scanners of this type, there is also an apparatus that not only reads an original in response to a command from a connected personal computer but that also is capable of reading an original in response to a command from a control panel provided on the flatbed scanner itself. With such an apparatus, it is possible to read a transparent original using the apparatus in stand-alone fashion.

Assume that a desired frame of film is to be read using an image reading apparatus that is capable of reading a transparent original in the prior art. If the image reading apparatus has been connected to a personal computer, a preview (coarse scan) of the film strip (usually six frames per strip in the case of 35-mm photographic film) that includes the desired frame can be commanded from the connected personal computer, the frame desired to be read can be designated from the personal computer based upon the result of preview displayed on the screen of the personal computer, and only the designated frame can be final-scanned (scanned in high-resolution).

However, in a case where reading of film is performed using the control panel provided on the image reading apparatus, as when a personal computer has not been connected (inclusive of a case where the personal computer cannot be used immediately, such as when the personal computer has been connected but has not been started up), a frame cannot be specified. The only method available is the troublesome method of deleting the read data of unnecessary frames after all frames have been scanned.

An image reading apparatus that has appeared on the market employs a reflective original referred to as a navigation sheet on which is entered the content or conditions of image read processing, such as a designation of a frame or a designation of a trimming area, in order to enhance the feasibility and convenience of reading a transparent original by means of a stand-alone image reading apparatus. The navigation sheet is read by the apparatus and the content of image read processing to be executed is specified by the navigation sheet, thereby making it possible to designate a frame to be read even in a reading operation by a stand-alone apparatus. These image readers that are capable of utilizing a navigation sheet include one (proposed by, e.g., Japanese Patent Application Laid-Open No. 8-331494) in which a navigation sheet and film are read by separate reading units.

In another proposed apparatus (for example, see the specification of Japanese Patent Application Laid-Open No. 10-224528), the image of each frame of film is read and recorded on an optical disk when the navigation sheet is created, and a frame image that has been designated from the navigation sheet is printed using the data read from the optical disk without requiring that the designated frame image be read again.

The image reading apparatus described in the specification of Japanese Patent Application Laid-Open No. 8-331494 adapted to read the navigation sheet and film by separate reading units is capable of reading the navigation sheet and film simultaneously. Although this shortens reading time, two separate reading units are required. This is problem in that it invites an increase in the size and cost of the apparatus.

Further, with the arrangement described in the specification of Japanese Patent Application Laid-Open No. 10-224528, it is required that all of the frame images be read at a high resolution when the navigation sheet is created. This takes time. Furthermore, since it is necessary to store the images read at the high resolution, a large-capacity storage device such as an optical disk is required.

SUMMARY OF THE INVENTION

Accordingly, a principal object of the present invention is to make it easier to use an image reading apparatus when the apparatus is employed to read a transparent original using a navigation sheet.

According to an aspect of the present invention, there is provided an image reading apparatus comprising: an original table on which a reflective original and a transparent original can be placed; an image reading unit capable of reading a reflective original and a transparent original that have been placed on the original table; and a controller which exercises control in such a manner that in a case where the transparent original that has been placed on the original table is to be read based upon reading conditions that have been entered on a predetermined reflective original, first the predetermined reflective original, which has been placed on the original table at a position thereof different from that of the transparent original, is read, and then the transparent original is read on the basis of the reading conditions.

According to another aspect of the present invention, there is provided a method of controlling an image reading apparatus, comprising: a reflective-original reading step of executing read processing for reading a reflective original with regard to a first area on an original table on which the reflective original and a transparent original can be placed; a recognition step of recognizing result of reading executed at the reflective-original reading step; and a transparent-original reading step of executing read processing for reading the transparent original based upon result of recognition performed at the recognition step, with regard to a second area on the original table.

In accordance with the present invention, an image reading apparatus capable of reading a reflective original and a transparent original is designed to make it easier to use the apparatus in a case where a transparent original is read based upon reading conditions that have been entered on a reflective original.

Other objects and advantageous besides those discussed above shall be apparent to those skilled in the art from the description of a preferred embodiment of the invention which follows. In the description, reference is made to accompanying drawings, which from a part thereof, and which illustrate an example of the various embodiments of the invention.

Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

Preferred embodiments of the present invention will now be described in detail in accordance with the accompanying drawings. It should be noted that the dimensions, materials, shapes and relative placement of the structural parts described in the following embodiments are merely examples unless it is clearly stated otherwise and that the scope of the present invention is in no way limited thereby.

Overall Structure

Figure 2:
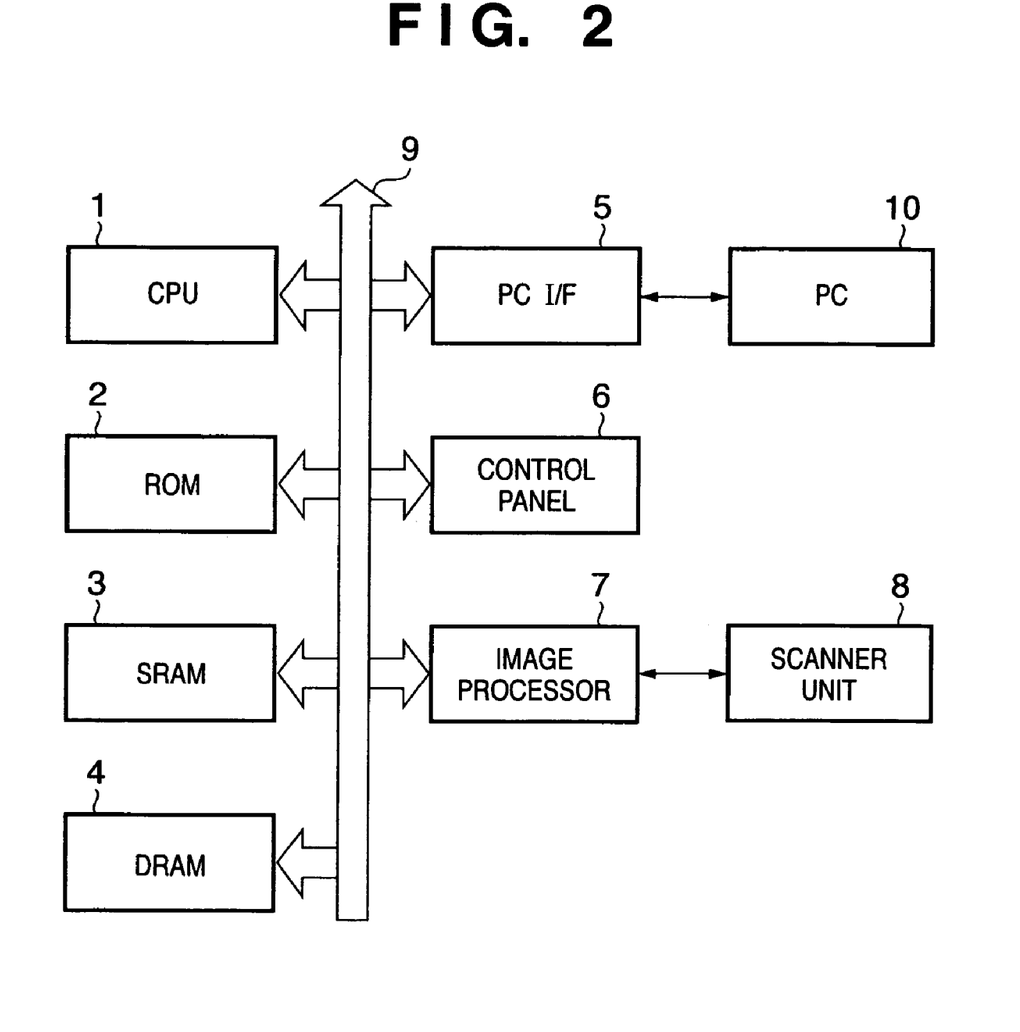
FIG. 2 is a block diagram illustrating an example of the structure of an image reading apparatus according to the first embodiment of the present invention.

FIG. 2 is a block diagram illustrating the basic structure of an image reading apparatus according to an embodiment of the present invention.

As shown in FIG. 2, the apparatus includes a CPU (Central Processing Unit) 1 for executing processing to control the various components of the apparatus; a ROM 2 for storing the control processing program executed by the CPU 1 and parameters necessary for this control processing; an SRAM (Static RAM) 3 for storing various specific data and used as a work area so that the CPU may executed processing; a DRAM 4 for storing image data and the like received from an external personal computer 8 and usable also as work area for the CPU 1 in a manner similar to that of the SRAM 3; a personal computer interface (PC I/F) 5 for interfacing an external personal computer 10; a control panel 6 having keys and buttons whereby the user applies commands to the apparatus and performs various operations and including a display device and speaker for notifying the user of the operating status of the apparatus; an image processor 7, which is connected to a scanner unit 8, having functions for executing shading correction processing, which corrects for shading distortion caused by an image sensor incorporated within the scanner unit 8, as well as various image processing; and the scanner unit 8. The latter incorporates the aforementioned image sensor, which functions to convert reflected light from a reflective original or reading white plate or transmitted light that has passed through a transparent original to an electric signal, and has a light source for illuminating the reflective/transparent original or reading white plate.

The blocks constituted by the CPU 1, ROM 2, SRAM 3, DRAM 4, PC I/F 5, control panel 6 and image processor 7 are connected to a system bus 9 and use the system bus 9 to exchange data among themselves.

Operation for Reading Originals

Operation when an original is read using the image reading apparatus having this structure will now be described.

When an original is to be read, first a read request is sent from the external personal computer 10 and the request is transmitted to the CPU 1 via the PC I/F 5. In accordance with the control program that has been stored in the ROM 2, the CPU 1 initializes each of the blocks and particularly instructs the image processor 7 to initialize the scanner unit 8 and to execute processing mainly for reading in shading correction data in order to execute a shading correction, thereby preparing for reading of the original.

Next, when an actual reading request command is sent from the external personal computer 10 and is received by the CPU 1 via the PC I/F 5, the CPU 1 controls the scanner unit 8 via the image processor 7 and reads the original. The scanner unit 8 has an elongated image sensor, which is referred to ordinarily as a line sensor, extending along the main scanning direction. The original is read line by line while this image sensor is moved in a sub-scanning direction, which is the direction perpendicular to the main scanning direction.

The image processor 7 applies prescribed image processing to the image data of the original read by the scanner unit 8 and stores the image data that results from this image processing in the DRAM 4 temporarily. The image data that has been stored in the DRAM 4 is transferred to the external personal computer 10 via the PC I/F 5. This processing is repeated until the reading of the area specified by the reading area ends.

In a case where the external personal computer 10 is in a state in which it cannot accept image data (a case where the personal computer is performing another operation or has been shut down), it is also possible to execute processing up to the storing of the image data in the DRAM 4 and subsequently transfer the image read out of the DRAM 4 at the moment there is a request from the external personal computer.

The foregoing is the operation for reading an original in response to a command from the external personal computer 10. However, the image reading apparatus according to this embodiment is also capable of reading an original in response to a command from the control panel 6 on the apparatus. An operation for accepting image data also is possible. In this case, an operation identical with that described above becomes possible by commanding the reading of image data using the control panel 6 instead of in response to an image-data read request from the external personal computer 10.

Structure of Scanner Unit

The structure of the scanner unit 8 will be described next with reference to FIG. 4.

Figure 4:
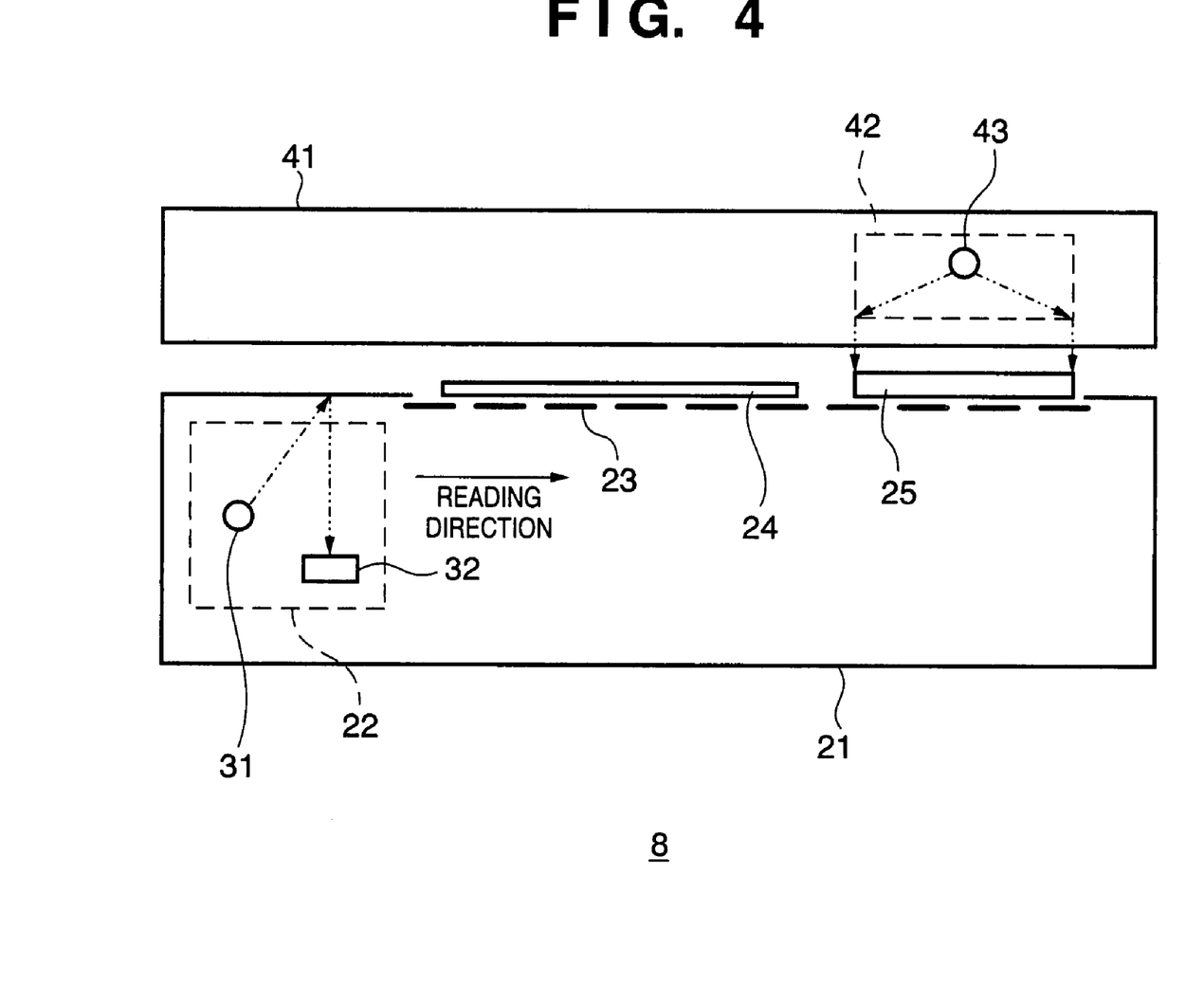

As shown in FIG. 4, the scanner unit 8 is a flatbed scanner comprising a scanner unit body 21 and a document cover 41. The document cover 41 holds flat the original placed on an original table 23 and internally accommodates a transparent-original illuminating unit 42 for illuminating a transparent original such as film. Incorporated within the transparent-original illuminating unit 42 is a transparent-original light source 43 from which the light uniformly illuminates the reading area of the transparent original. When an ordinary reflecting original is read, the transparent-original illuminating unit 42 is covered by a cover or the like. When a transparent original is read, the cover is removed to expose the transparent-original illuminating unit 42 and the transparent original is placed in the transparent-original reading area of the original table 23 while being held by a film guide (film holder).

The scanner unit body 21 has the shape of a box the top surface of which is formed by the original table 23 consisting of a transparent member such as glass. A scanner carriage unit 22 is disposed within the scanner unit body 21. Incorporated within the scanner carriage unit 22 are a reflective-original light source 31 for illuminating a reflective original such as a navigation sheet or printed matter, an image sensor 32 for receiving light, such as light reflected by a reflective original or light that has passed through a transparent original, that enters from the original table 23, for converting the light to an electric signal, and a lens (not shown) for forming the image represented by the reflected light from the reflective original or transmitted light passed through the transparent original on the image sensor 32. As mentioned above, the image sensor has an elongated shape extending along the main scanning direction (the direction perpendicular to the plane of the drawing of FIG. 4) and converts light, which is received line by line, to an electric signal. Reading in line units is repeated while the scanner carriage unit 22 is moved in the sub-scanning direction (the direction indicated as the reading direction in FIG. 4) perpendicular to the main scanning direction, whereby the original on the original table 23 is read.

The image reading apparatus according to this embodiment is such that in a case where the apparatus is in a mode for reading a transparent original based upon reading conditions set forth on a navigation sheet 24, the navigation sheet 24 is read at a position close to an initial position of the scanner carriage unit 22 on the original table 23, as shown in FIG. 4, after which the transparent original held in a film guide 25 is read. It should be noted that if the apparatus is in a mode for reading a transparent original without using the navigation sheet 24, then such reading of the navigation sheet 24 is not carried out. A detailed description of such case is not given here.

More specifically, the scanner carriage unit 22 is moved from the initial position shown in FIG. 4 in the reading direction along a guide, which is not shown. The operation for reading the navigation sheet 24 is performed when the scanner carriage unit 22 has been moved to a reading-start position of the navigation sheet 24. Since the navigation sheet 24 is a reflective original, at this time the reflective-original light source 31 accommodated within the scanner carriage unit 22 is lit, the reflected light is received by the image sensor 32 and the navigation sheet 24 is read. Information that has been entered on the navigation sheet 24 is acquired.

When the reading by the scanner carriage unit 22 reaches the trailing end of the navigation sheet 24 (or when reading has reached the reading area of the transparent original), the reflective-original light source 31 is extinguished, the light source 43 for the transparent original is lit and, on the basis of the information that was acquired by the reading of the navigation sheet 24, the transparent original being held by the film guide 25 is read.

Figure 3:
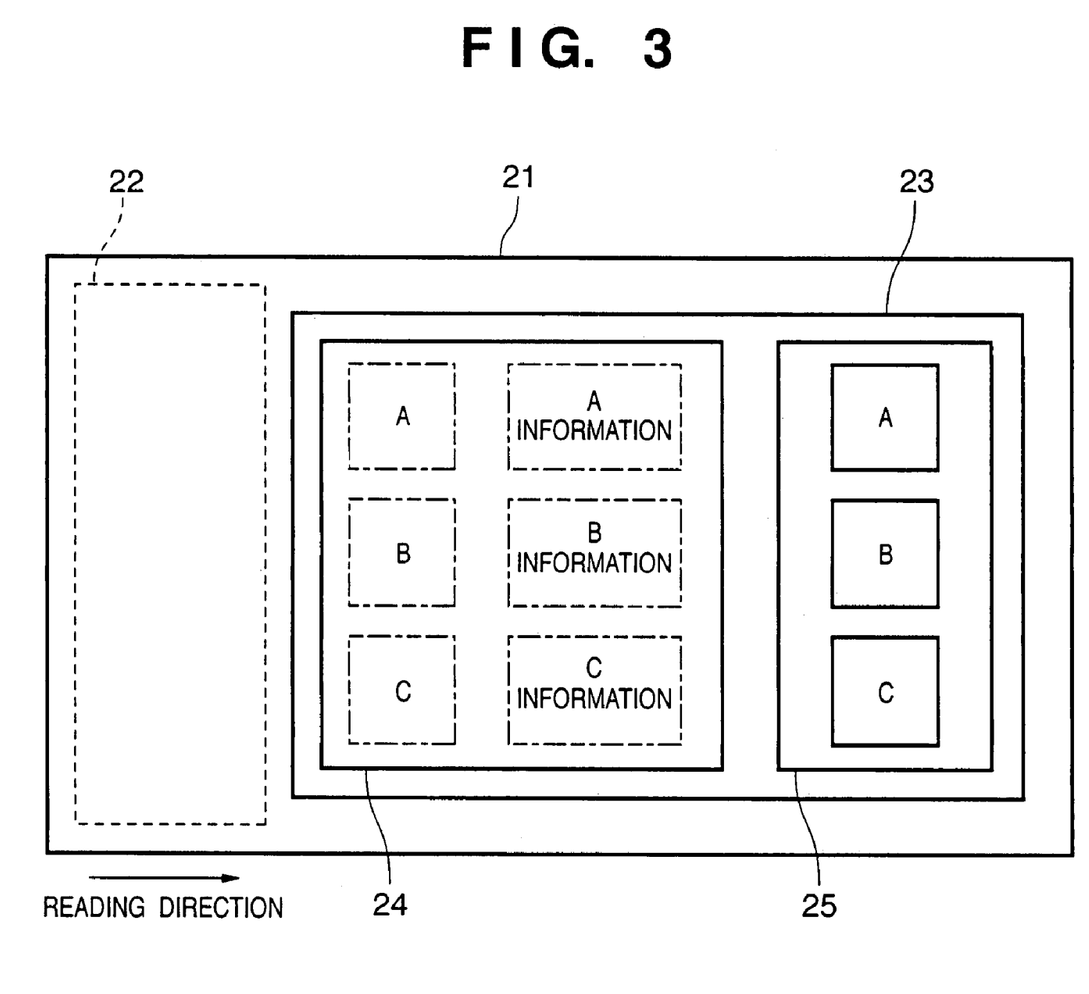
FIGS. 3 and 4 are diagrams describing the placement of a navigation sheet and film guide as well as read processing in an image reading apparatus according to an embodiment of the invention.

FIG. 3 is diagram showing the scanner unit body 21 as seen from above in the state depicted in FIG. 4.

As mentioned above, the navigation sheet 24 constituting the reflective original and the film guide 25 for holding the film constituting the transparent original are disposed on the original table 23. The navigation sheet 24 and the film held by the film guide 25 are read, in the order mentioned, while the scanner carriage unit 22 is moved in the direction of the arrow along a guide (not shown).

In this embodiment, it is assumed that the reading area of the transparent original corresponds to three frames of film and that the film guide 25 is capable of holding a strip of film of three frames. It is assumed that the navigation sheet 24 also similarly has a form on which it is possible to enter information conforming to three frames of film. Areas A, B and C of the film guide 25 in FIG. 3 are frames A, B and C of the film being held, and reduced-size images of film frames A, B and C have been printed in areas (reduced-image areas) A, B and C of the navigation sheet 24. Further, A, B and C information (A, B and C information areas) constitutes areas for designating information relating to reading of the film frames A, B and C, respectively. It should be noted that the images printed in the areas A, B and C are not limited to reduced-size images and may just as well be same-size images or enlarged-size images.

For example, if it is desired to read only frame A of the film, the frame designating area contained in the A information on the navigation sheet 24 is designated by a predetermined format, such as by filling in the designating area, before the navigation sheet 24 is placed on the original table 23. This information area of the navigation sheet 24 is read, frame A of the film is recognized as being the target for reading and the reading operation is performed.

Designatable read processing of an information area on the navigation sheet 24 is not limited to designation of a frame to be read and it is possible to freely set read resolution, number of read colors and reduction/enlargement, etc., on a per-frame basis. Further, designation of read processing may be performed with regard to the reduced-image areas and not just the information areas. In this embodiment, designation of a trimming area is performed in a reduced-image area, as will be described later.

It is assumed that the navigation sheet 24 has been created in advance utilizing an image forming apparatus such as a printer connected to the external personal computer 10. For example, this is done at the time of scanning for the purpose of previewing (preview scan) the frames A to C of the film held by the film guide 25.

Reading of Transparent Original Utilizing Navigation Sheet: Frame Designation

Figure 1:
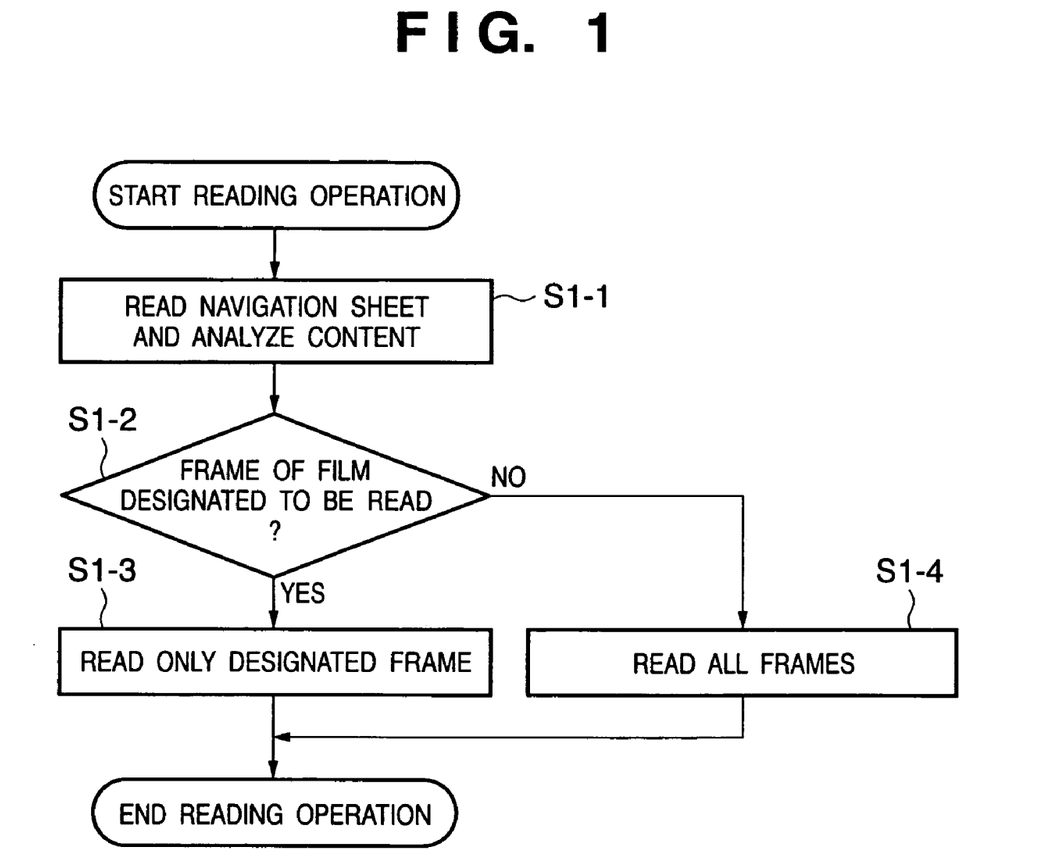
FIG. 1 is a flowchart illustrating an operation for designating and reading a transparent original using a navigation sheet in an image reading apparatus according to a first embodiment of the present invention.

Reading of a transparent original using the navigation sheet 24 will be described with reference to the flowchart of FIG. 1. The processing illustrated in the flowchart of FIG. 1 is executed in a case where "READ TRANSPARENT ORIGI- NAL USING NAVIGATION SHEET" has been specified from the control panel 6, by way of example.

It may be so arranged that before a read operation is executed, the user is given guidance regarding necessary preparations, such as the setting of the navigation sheet 24 or film guide 25 at the correct position and the removal of a cover (if one exists) from the transparent-original illuminating unit, by way of the display unit on the control panel 6.

First, in a manner similar to that in the case where a read request is issued by the external personal computer 10, preparations for reading the original are made. Specifically, in accordance with the control program that has been stored in the ROM 2, the CPU 1 initializes each of the blocks and particularly instructs the image processor 7 to initialize the scanner unit 8 and to execute processing, e.g., for reading in shading correction data in order to execute a shading correction, thereby preparing for reading of the original.

Reading of the navigation sheet 24 is performed at step S1-1. Since the navigation sheet 24 is a reflective original, the reflective-original light source 31 within the scanner carriage unit 22 is lit and the navigation sheet 24 is read while the scanner carriage unit 22 is moved in the direction of the arrow, as described above. When the reading of the navigation sheet 24 ends (or while the navigation sheet 24 is being read), the CPU 1 detects and recognizes, based upon the result of the reading operation, the information that has been entered on the navigation sheet 24 (here the particulars that have been entered in the information areas) and stores the result of recognition in the SRAM 3 or DRAM 4.

Next, at step S1-2, based upon the result of recognition of the navigation sheet 24, the CPU 1 determines whether a frame to be read has been designated with regard to the film held by the film guide 25. If it is determined that a frame designation has not been made ("NO" at step S1-2), then it is deemed in this embodiment that this means a designation to read all frames has been made and, hence, control proceeds to step S1-4, where all frames of the film held by the film guide 25 are read.

That is, the scanner carriage unit 22 is moved to the starting position of the transparent-original reading area, the reflective-original light source 31 is extinguished, the light source 43 for the transparent original is lit and all frames of the film held by the film guide 25 are read.

On the other hand, if it is determined at step S1-2 that a frame to be read has been designated by the navigation sheet 24 ("YES" at step S1-2), then control proceeds to step S1-3 and only the frame designated for reading among the frames A to C of the film held by the film guide 25 is read.

That is, the scanner carriage unit 22 is moved to the starting position of the transparent-original reading area, the reflective-original light source 31 is extinguished, the light source 43 for the transparent original is lit and the image of the designated frame from the film held by the film guide 25 is read.

Reading of Transparent Original Utilizing Navigation Sheet: Trimming Designation With the image reading apparatus according to this embodiment, a trimming designation at the time of a transparent-document reading operation can be made utilizing the reduced-size images on the navigation sheet 24, as described earlier. The designation of trimming using the navigation sheet 24 and the reading operation will be described with reference to FIGS. 5A, 5B and FIG. 6.

Figure 5A:
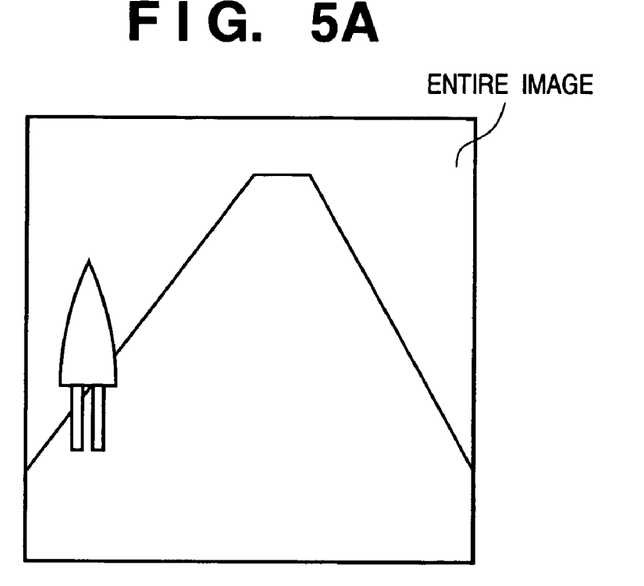
FIGS. 5A and 5B are diagrams describing an example of a method of designating a trimming area on a navigation sheet.
Figure 5B:
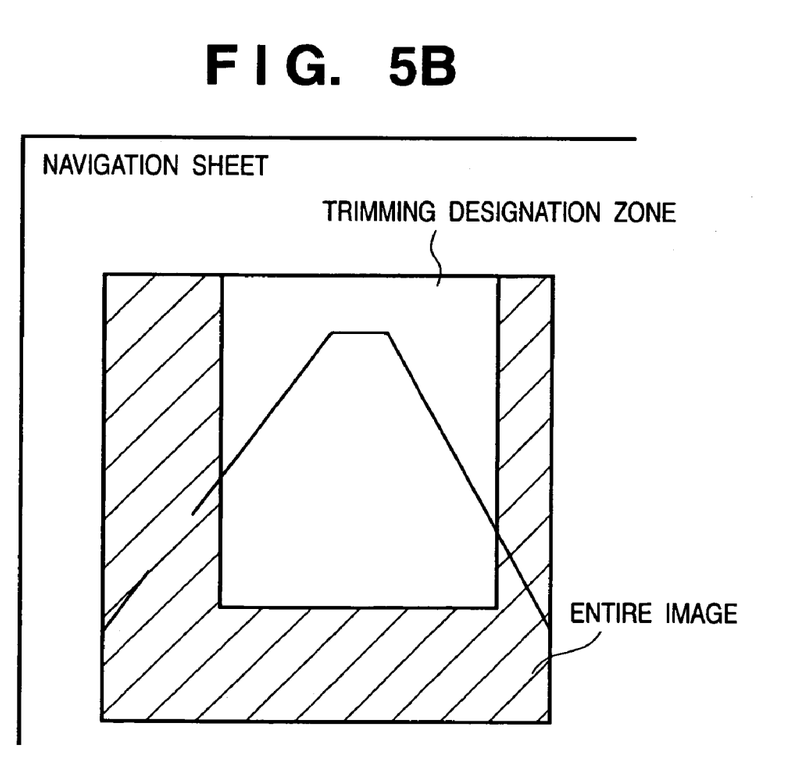

FIGS. 5A and 5B are diagrams illustrating an example of a trimming designation method using the navigation sheet 24, in which FIG. 5A shows an actual frame image and FIG. 5B a corresponding reduced-size image area on the navigation sheet 24. As mentioned above, a reduced-size image of each frame of the film held by the film guide 25 has been printed in the reduced-size image areas of the navigation sheet 24. In this embodiment, a trimming designation area entered on the reduced-size image is recognized and the image of the corresponding frame is read.

FIG. 5B illustrates an example of what is entered on a reduced-size image. This is an example of a case where a trimming designation is made to extract the mountain part of an image from an image containing the mountain and a tree (i.e., to delete the tree part of the image). The part to be extracted is designated by filling in areas (areas that are not desired to be read) other than the area desired to be read (namely the trimming area) in the image that has been printed in the reduced-size image area of the navigation sheet 24. The unwanted areas are filled in by the hatching indicated.

In the example of FIGS. 5A and 5B, portions that are not to be read are designated by filling them in with hatching. However, so long as such areas can be distinguished from image data read in, such as by blackening the areas or expressing the boundaries thereof using a specific color, the area to be read in can be designated by any method whatsoever. Conversely, it may be so arranged that a portion desired to be read in is designated by hatching.

Figure 6:
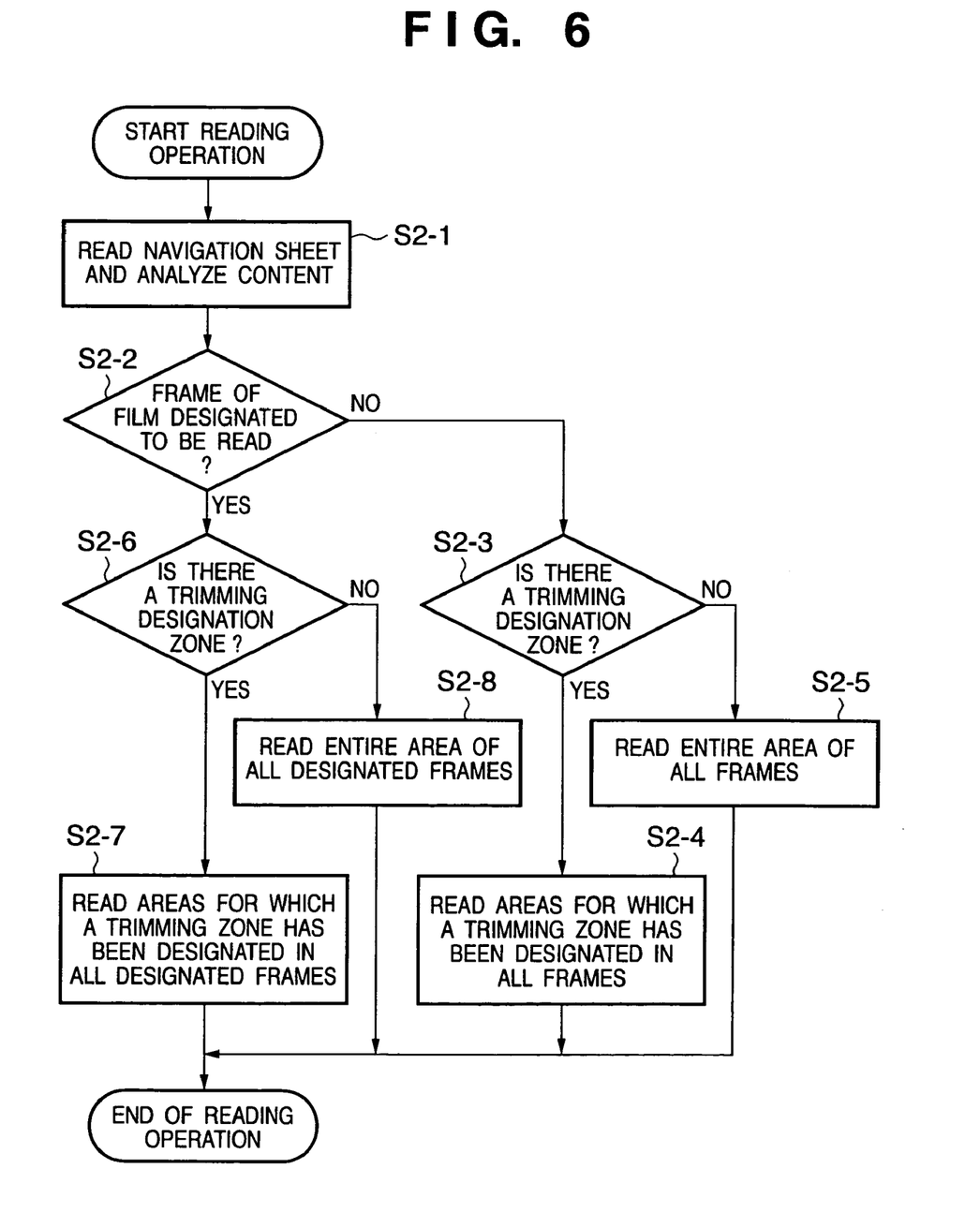
FIG. 6 is a flowchart illustrating an operation for designating a frame of a transparent original, designating trimming and performing reading utilizing a navigation sheet in the image reading apparatus according to the first embodiment of the present invention.

Next, a reading operation in a case where trimming has been designated by the method shown in FIGS. 5A and 5B will be described with reference to the flowchart of FIG. 6. In a manner similar to the operation described in connection with FIG. 1, this operation is executed in a case where "READ TRANSPARENT ORIGINAL USING NAVIGATION SHEET" has been specified from the control panel 6, by way of example.

First, at step S2-1, the navigation sheet 24 is read, the information that has been entered on the navigation sheet 24 (here the frame designation that has been entered in the information area and the trimming area designation that has been entered in the reduced-size image area) is detected and recognized and the result of recognition is stored in the SRAM 3 or DRAM 4. This fundamental operation is the same as that of step S1-1 in FIG. 1.

Next, at step S2-2, it is determined based upon the result of recognition of the navigation sheet 24 whether designation of a frame to be read has been made. If it is determined that a frame designation has not been made ("NO" at step S2-2), then control proceeds to step S2-3 and it is determined whether a trimming area has been set. If it is determined that a trimming area has not been set ("NO" at step S2-3), control proceeds to step S2-5. Here the entire frame of all frames of the film held by the film guide 25 is read without trimming being executed. On the other hand, if it is determined that a trimming area has been designated ("YES" at step S2-3), then control proceeds to step S2-4, where all frames of the film held by the film guide 25 are read. At this time, on the assumption that trimming processing will be executed with regard to frames for which trimming has been designated in the corresponding reduced-size image areas, a read operation is executed that makes it possible to obtain images at least of the areas designated by the corresponding reduced-size image areas of the navigation sheet 24. If there is a frame for which a trimming designation has not been made in the corresponding reduced-size image area, then this frame is read in its entirety.

If it is determined at step S2-2 that a frame designation has been made ("YES" at step S2-2), then control proceeds to step S2-6, where it is determined whether a trimming area has been set. If it is determined that a trimming area has not been set ("NO" at step S2-6), control proceeds to step S2-8. Here the entire frame of all designated frames of the film held by the film guide 25 is read without trimming being executed.

If it is determined that a trimming area has been designated ("YES" at step S2-6), then control proceeds to step S2-7. Here, on the assumption that trimming processing will be executed with regard to frames for which trimming has been designated in the corresponding reduced-size image areas in regard to designated frames of the film held by the film guide 25, a read operation is executed that makes it possible to obtain images at least of the areas designated by the corresponding reduced-size image areas of the navigation sheet 24. If there is a frame for which a trimming designation has not been made in the corresponding reduced-size image area, then this frame is read in its entirety.

In the case described above, the trimming designation is made frame by frame using the individual reduced-size image areas. However, it is also possible to adopt an arrangement in which the navigation sheet 24 is provided with a trimming designation area that is made common for all frames and designate a trimming area in this area to thereby read a trimming area that is common for all frames.

Thus, in accordance with this embodiment, a navigation sheet and transparent original placed at different positions on an original table are read one after the other, whereby the transparent original can be read based upon the transparent-original reading conditions, which have been entered on the navigation sheet, by a single reading operation. Thus the apparatus is very easy to use. Further, since the conditions for reading the transparent original can be designated on the navigation sheet, very elaborate reading can be achieved even if a transparent original is read by a stand-alone image reading apparatus.

Further, since the navigation sheet and transparent original are read using a common image sensor, a plurality of reading means, which are required in the prior art of Japanese Patent Application Laid-Open No. 8-331494, are unnecessary. In addition, since it is possible to successively read the navigation sheet and a transparent original such as film, it is unnecessary to interchange the navigation sheet and transparent original. Furthermore, even in a case where a designation of transparent-original reading conditions such as a frame designation or trimming designation is made using a navigation sheet, the details that have been entered on the navigation sheet can be checked first. Therefore, it is possible to mitigate the troublesome operation of reading all of a plurality of held transparent originals such as film, as in a case where the film guide 25 holds a plurality of film strips along the sub-scanning direction.

Further, since it is possible to designate a trimming area, it is possible to read only the designated area in a case where a transparent original such as film is read. A transparent original such as trimmed film can be read without executing trimming processing in an external personal computer.

Second Embodiment

The first embodiment has been described with regard to an example in which the present invention is applied to an image reading apparatus that reads only a transparent original. However, the present invention is also applicable to an image reading apparatus having an image forming function. In this embodiment, an example in which the present invention is applied to a digital multifunction apparatus serving as an example of such an image reading apparatus is described. The digital multifunction apparatus is one type of copier and has an image reading function, an image forming function and a facsimile transceive function.

Overall Structure

Figure 7:
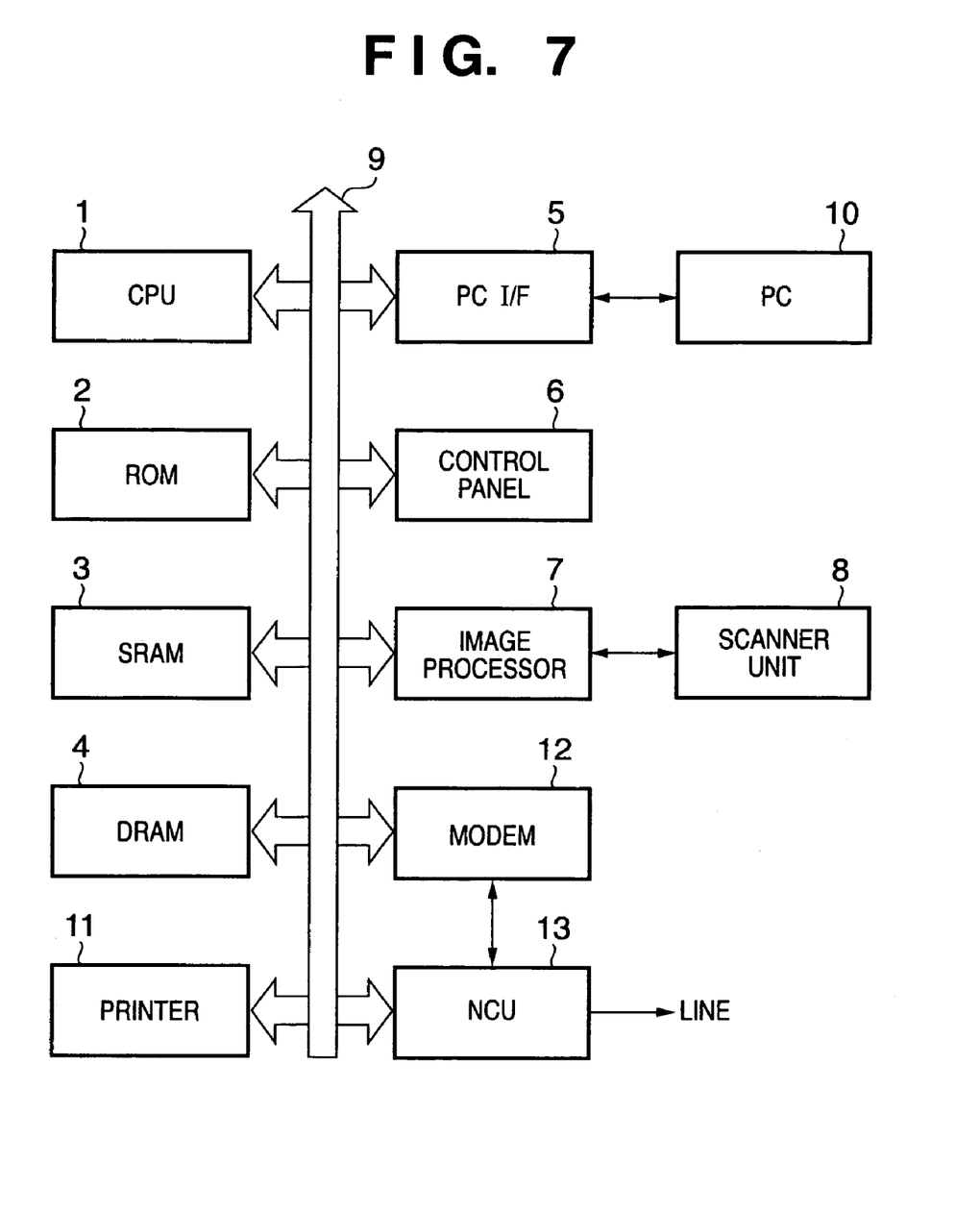
FIG. 7 is a block diagram illustrating a digital multifunction apparatus serving as an image reading apparatus according to a second embodiment of the present invention.

FIG. 7 is a block diagram illustrating an example of the structure of a digital multifunction apparatus according to this embodiment. Components equivalent to those in FIG. 2 described in the first embodiment are designated by like reference characters. It should be evident from a comparison of these two diagrams that this embodiment has a structure obtained by adding a printer 11, modem 12 and NCU (Network Control Unit) 13 to the structure of FIG. 2.

The printer 11 has a function for printing image data sent from the external personal computer 10 and data that has been stored in the SRAM 3 or DRAM 4. The modem 12 functions to send and receive facsimile data. The NCU 13 functions to connect this apparatus to a public line.

The printer 10, modem 12 and NCU 13 are connected to the system bus 9. Exchange of data among these units constituting the apparatus is performed using the system bus 9. It should be noted, however, that exchange of data between the modem 21 and NCU 31 is performed directly without the intermediary of the system bus 9.

Copying a Transparent Original

The flow of overall operation in a case where a transparent original such as film is copied using the image reading apparatus having this structure will be described.

First, the user places a navigation sheet and a film guide at prescribed positions on the original table of scanner unit 8, which has a structure similar to that of the scanner unit in the first embodiment, and specifies copying of the transparent original from the control panel 6. This command is sent to the CPU 1, which initializes each of the blocks of the apparatus in accordance with the control program that has been stored in the ROM 2. Next, the CPU 1 performs the operation to read the image of the original while controlling the image processor 7 and scanner unit 8, and, at the same time, stores the read digital image data in the DRAM 4 while controlling the system bus 9. When a state in which the digital image data is capable of being printed by the printer 11 has been attained, the CPU 1 sends the printer 11 the digital image data that has been stored in the DRAM 4 and starts the printing of the digital image data.

Figure 8:
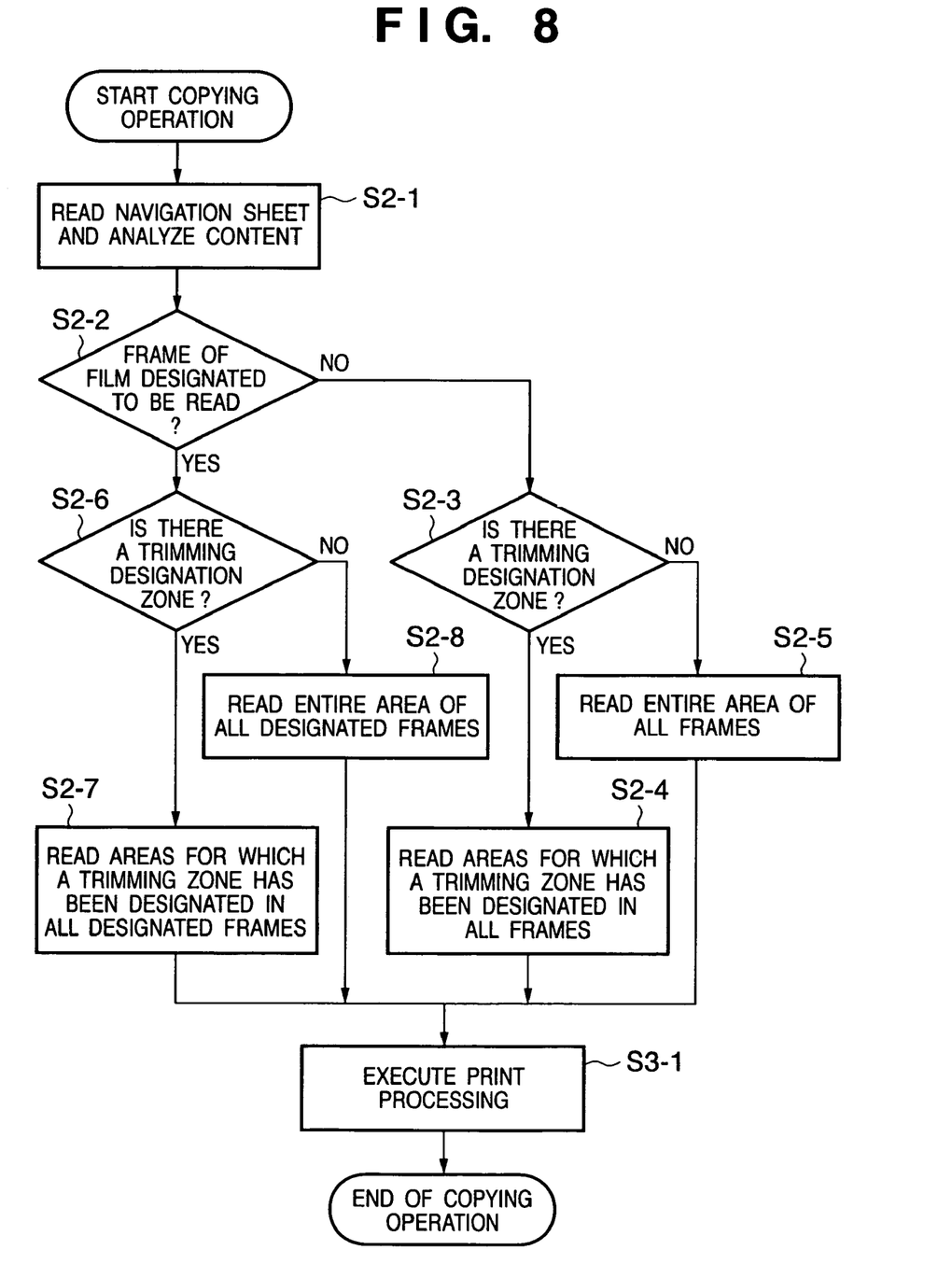
FIG. 8 is a flowchart illustrating an operation for designating a frame of a transparent original, designating trimming and performing reading utilizing a navigation sheet in the image reading apparatus according to the second embodiment of the present invention.

FIG. 8 is a flowchart of a copying operation that includes a trimming function in this implementation. Processing steps identical with those of FIG. 6 described in conjunction with the first embodiment are designated by like step numbers. With the exception of the fact that a step S3-1 for outputting read digital image data by the printer 11 has been appended at the end of the flowchart, the processing is the same as that of the first embodiment, namely the processing of steps S2-1 to S2-8 up to the reading of the image of the original.

More specifically, a navigation sheet equivalent to that described in the first embodiment is prepared, read processing that takes frame designation and trimming designation into account as described in the first embodiment is executed, and the read digital image data is stored in the SRAM 3 or DRAM 4. The stored digital image data is read out and print processing is executed using the printer 11. Since the image reading apparatus according to this embodiment has an image forming function, the creation of the navigation sheet itself can be performed by the apparatus in stand-alone fashion. Since the creation of the navigation sheet is not related to the present invention, this will not be described in detail here. However, it will suffice to read all frame images contained in the transparent original held by the film guide 25, place a reduced-size image of each frame in a previously prepared template for printing a navigation sheet and output the navigation sheet, which has the format described above, from the printer 11.

It should be noted that electrophotography or ink-jet techniques can be applied as the method of printing the image data in the printer 11. However, the available techniques are not limited to these and other suitable methods of printing image data can also be applied.

Thus, the effects obtained in this embodiment are similar to those of the first embodiment.

Other Embodiments

In order to facilitate the description and understanding of the present invention, the embodiments set forth above have a form in which the reading area of a transparent original corresponds to three frames of a strip of film, the film guide 25 is capable of holding a strip of film of three frames and information equivalent to three frames of film can be entered on the navigation sheet 24. However, it goes without saying that the present invention is similarly applicable even in a case where the film guide 25 is adapted so that it can hold a strip of film containing a greater number of frames or a plurality of strips of film. In such case the navigation sheet 24 used would also have a form that conforms to the structure of the film guide 25.

It should be noted that the present invention also covers a case where software programs for implementing the functions of the above embodiments are supplied directly from a recording medium, or through use of wired/wireless communication, to a system or apparatus having a computer that is capable of executing the above-mentioned programs, and the system or apparatus executes the supplied programs to thereby implement the equivalent functions.

Accordingly, program code per se supplied to and installed in a computer in order that the computer may execute the processing of the present invention also implements the invention. In other words, the computer program that implements the processing of the present invention also is covered by the present invention.

In this case, so long as the system or apparatus has the functions of the program, the form of the program, e.g., object code, a program executed by an interpreter or script data supplied to an operating system, etc., does not matter.

Examples of recording media by which the program can be supplied are magnetic recording media such as a flexible disk, hard disk and magnetic tape, optical/magneto-optical storage media such as a magneto-optical disk, CD-ROM, CD-R, CD-RW, DVD-ROM, DVD-R and DVD-RW, and a non-volatile semiconductor memory.

As for the method of supplying the program using wired/wireless communication, the computer program itself for forming the present invention in the server of a computer network, or a data file (program-data file) that can serve as a computer program for forming the present invention in a client computer, such as a compressed file having an automatic install function, can be stored and the program-data file can be downloaded to a connected client computer. In such case the program-data file can be divided into a plurality of segment files and the segment files can be deployed at different servers.

In other words, the present invention also covers a server apparatus that allows multiple users to download a program-data file for the purpose of implementing the functions of the present invention by computer.

Further, it is also possible to encrypt and store the program of the present invention on a storage medium such as a CD-ROM, distribute the storage medium to users, allow users who meet certain requirements to download decryption key information from, e.g., a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer can perform all or a part of the actual processing based upon commands in the program so that the functions of the foregoing embodiments can be implemented by this processing.

Furthermore, after the program read from a recording medium is written to a function expansion board inserted into the computer or to a memory provided in a function expansion unit connected to the computer, a CPU or the like mounted on the function expansion board or function expansion unit can perform all or a part of the actual processing based upon commands in the program so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-54639 filed on Feb. 27, 2004, which is hereby incorporated by reference herein.

What is claimed is:

1. An image reading apparatus comprising:
an original table on which a reflective original and a transparent original can be placed;
an image reading unit capable of reading a reflective original and a transparent original that have been placed on the original table; and
a controller which exercises control in such a manner that in a case where the transparent original that has been placed on the original table is to be read by the image reading unit based upon reading conditions that have been entered on a predetermined reflective original, the predetermined reflective original, which has been placed on the original table at a position thereof different from that of the transparent original, is read, and then the transparent original is read on the basis of the reading conditions,
wherein the reading conditions of the transparent original include a trimming designation to designate a partial area to be read within a frame that is to be read from among a plurality of frames contained in the transparent original using a reduced-size image of the frame to be read.

2. A method of controlling an image reading apparatus, comprising:
a reflective-original reading step of executing read processing for reading a reflective original with regard to a first area on an original table on which the reflective original and a transparent original can be placed;
a recognition step of recognizing result of reading executed at said reflective-original reading step; and a transparent-original reading step of executing read processing for reading the transparent original based upon a result of recognition performed at said recognition step, with regard to a second area on the original table, wherein the second area is different from the first area, and wherein the reading conditions of the transparent original include a trimming designation to designate a partial area to be read within a frame that is to be read from among a plurality of frames contained in the transparent original using a reduced-size image of the frame to be read.

3. A computer readable recording medium storing for causing a computer to execute a method of controlling an image reading apparatus, comprising:

- a reflective-original reading step of executing read processing for reading a reflective original with regard to a first area on an original table on which the reflective original and a transparent original can be placed;
- a recognition step of recognizing a result of reading at said reflective-original reading step; and
- a transparent-original reading step of executing read processing for reading the transparent original based upon a result of recognition performed at said recognition step, with regard to a second area on the original table, wherein the second area is different from the first area, and wherein the reading conditions of the transparent original include a trimming designation to designate a partial area to be read within a frame that is to be read from among a plurality of frames contained in the transparent original using a reduced-size image of the frame to be read.

4. A computer-readable recording medium storing a program for causing a computer to execute a method of controlling an image reading apparatus, comprising a reflective-original reading step of executing read processing for reading a reflective original with regard to a first area on an original table on which the reflective original and a transparent original can be placed; a recognition step of recognizing result of reading executed at said reflective-original reading step; and a transparent-original reading step of executing read processing for reading the transparent original based upon a result of recognition performed at said recognition step, with regard to a second area on the original table, wherein the second area is different from the first area, and wherein the reading conditions of the transparent original include a trimming designation to designate a partial area to be read within a frame that is to be read from among a plurality of frames contained in the transparent original using a reduced-size image of the frame to be read.

* * * * *

UNITED STATES PATENT AND TRADEMARK OFFICE
CERTIFICATE OF CORRECTION

PATENT NO. : 7,408,685 B2
APPLICATION NO. : 11/062844
DATED : August 5, 2008
INVENTOR(S) : Hiroyuki Noguchi et al.

It is certified that error appears in the above-identified patent and that said Letters Patent is hereby corrected as shown below:

COLUMN 2:

Line 14, "problem" should read --a problem--;
Line 50, "result" should read --the result--;
Line 53, "result" should read --the result--;
Line 62, "advantageous" should read --advantages--; and
Line 66, "from" should read --form--.

COLUMN 3:

Line 63, "executed" should read --execute--; and
Line 65, "work" should read --a work--.

COLUMN 13:

Line 13, "storing for" should read --storing a program for--.

Signed and Sealed this

Sixth Day of January, 2009

JON W. DUDAS
*Director of the United States Patent and Trademark Office*